US009794195B1

(12) United States Patent
Wilson et al.

(10) Patent No.: US 9,794,195 B1
(45) Date of Patent: Oct. 17, 2017

(54) COMMUNICATION DEVICE WITH RECEDED PORTS

(71) Applicant: Amazon Technologies, Inc., Seattle, WA (US)

(72) Inventors: Matthew Shawn Wilson, Seattle, WA (US); Nafea Bshara, San Jose, CA (US); Peter Nicholas Desantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/752,518

(22) Filed: Jun. 26, 2015

(51) Int. Cl.
*H04L 12/931* (2013.01)

(52) U.S. Cl.
CPC .......... *H04L 49/40* (2013.01); *H04L 49/351* (2013.01)

(58) Field of Classification Search
CPC .............................. H04L 49/40; H04L 49/351
USPC ............................................. 361/679.02, 679
See application file for complete search history.

(56) References Cited

U.S. PATENT DOCUMENTS

| | | | | |
|---|---|---|---|---|
| 5,536,177 A * | 7/1996 | Casey | ................ | H01R 12/7005 439/74 |
| 6,537,106 B1 * | 3/2003 | Follingstad | .......... | H01R 13/518 439/534 |
| 8,154,879 B2 * | 4/2012 | Chao | .................... | H05K 1/0271 361/752 |
| 8,189,603 B2 * | 5/2012 | Thomas | .................. | H04L 49/40 370/401 |
| 9,215,814 B2 * | 12/2015 | Blakemore | ............ | H05K 3/301 |
| 2007/0165618 A1 * | 7/2007 | Niazi | ...................... | H04L 49/40 370/360 |
| 2009/0023309 A1 * | 1/2009 | Knapp | ................. | H05K 1/0295 439/65 |
| 2009/0051293 A1 * | 2/2009 | Houdek | ............ | G02F 1/133603 315/32 |
| 2009/0279253 A1 * | 11/2009 | Musciano | .......... | H05K 7/20727 361/692 |
| 2011/0159710 A1 * | 6/2011 | Crighton | .............. | H01R 12/724 439/65 |

(Continued)

OTHER PUBLICATIONS

Nathan Farrington, et al., "Scaling Data Center Switches Using Commodity Silicon and Optics", UC San Diego, 2009, pp. 1-2.

(Continued)

*Primary Examiner* — Dion R Ferguson
*Assistant Examiner* — Mandeep S Buttar
(74) *Attorney, Agent, or Firm* — Robert C. Kowert; Meyertons, Hood, Kivlin, Kowert & Goetzel, P.C.

(57) ABSTRACT

A communication device with receded ports includes one or more port connectors in a first position, one or more port connectors in a setback position that is receded back from the first position, and one or more port connectors in one or more additional setback positions. The communication device with receded ports includes, a circuit board, and one or more circuits mounted on the circuit board. Circuit traces electrically connect the port connectors in the first position, the setback position, and the one or more subsequent setback positions to a circuit mounted on a circuit board. The port connectors in the first position, setback position, and one or more subsequent setback positions may be situated in a triangular pattern, stair-stepped pattern, curved pattern, or some other pattern.

22 Claims, 9 Drawing Sheets

(56) References Cited

U.S. PATENT DOCUMENTS

2012/0013514 A1* 1/2012 Yang .................... H01Q 21/062
  343/746
2016/0183402 A1* 6/2016 Tamarkin ............. H05K 7/1492
  361/679.4

OTHER PUBLICATIONS http://www.cisco.com/c/en/us/tdldocs/switchesllan/catalyst4500/hardware/configurati on/notes/78 18337.html#wp114359, "Installation and Configuration Note for the Catalyst 4500 E-Series Supervisor Engine 6-E", Downloaded Apr. 15, 2015, pp. 1-16.
http://www.edn.com/electronics-blogs/bakers-best/4426162/PCB-signal-coupling-can-be-a-problem, "PCB signal coupling can be a problem", Downloaded Apr. 14, 2015, pp. 1-7.
Mohammad S. Sharawi, "Practical Issues in high speed PCB design", IEEE, 2004, p. 24.
Texas Instruments, "Section 5 High Speed PCB Layout Techniques", High Speed Analog Design and Application Seminar, pp. 1-41.

* cited by examiner

COMMUNICATION DEVICE WITH RECEDED PORTS

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers.

In data centers, a significant number of network connections may be required in each server rack. Each rack in a data center may, for example, include a top-of-rack switch that has a receptacle panel or port panel for plugging in numerous network connector plugs (for example, 48 ports). The network connector ports may connect the top-of-rack switch to servers mounted in a rack and also connect the top-of-rack switch to a shared network within the data center.

A network switch, such as a top-of-rack switch, may comprise several ports mounted on a front face of the network switch. The network switch may include a printed circuit board that includes switching circuits and circuit traces that electrically connect the switching circuits to the ports mounted on the network switch. The lengths of the circuit traces connecting the ports to the switching circuits may vary considerably depending on the location of a given port on the front face of the network switch relative to a switching circuit of the network switch. For example, a port mounted on an outer edge of the front face of a network switch may be connected to a switching circuit in the center of the network switch by a circuit trace that is longer than a port mounted in the center of the front face of the network switch connected to the same switching circuit. Also a network switch, such as a top-of-rack switch, may have a limited amount of surface area on the front face of the switch to mount receptacles or ports to connect servers to the network switch.

Figure 1:
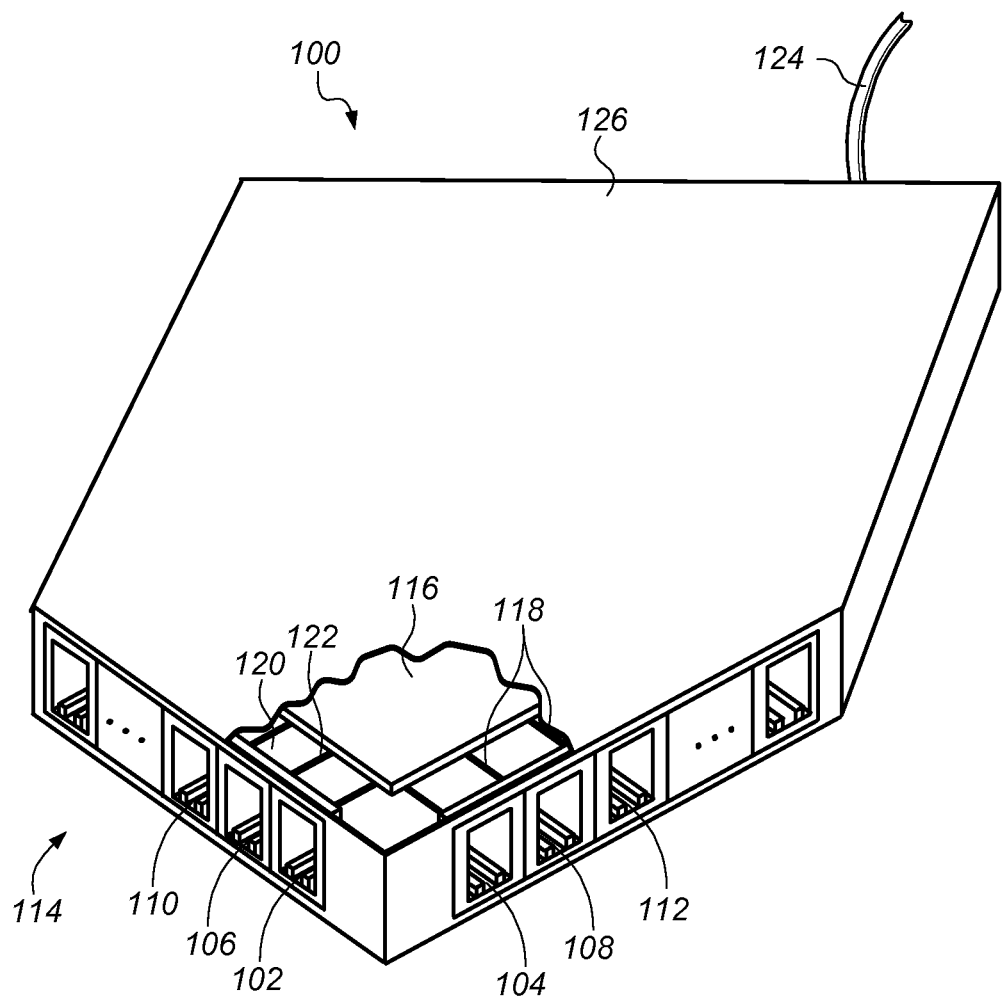
FIG. 1 illustrates a communication device with receded ports mounted in successive setback positions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a communication device with receded ports mounted in successive setback positions are described. According to one embodiment, a system includes a rack, one or more computing devices (such as one or more servers) mounted in the rack and a communication device with receded ports mounted in successive setback that is a network switch, wherein the network switch is mounted in the rack. The network switch includes a plurality of network ports connected to the computing devices mounted in the rack. The network switch also comprises a printed circuit board (PCB) that includes a plurality of circuit traces that electrically connect the network ports of the network switch to connectors of a switching circuit mounted on the printed circuit board of the network switch, wherein the printed circuit board is configured to switch communications received via the plurality of network ports. As used herein, "electrically connected" components may include one or more intervening components such that an electrical connection between the electrically connected components includes a series of segments forming an electrical path between the electrically connected components. For example a network port may be electrically connected to a connector of a switching circuit with a circuit trace that includes one or more intervening components in the electrical path of the circuit trace such as a repeater/re-timer circuit, a capacitor, a resistor, etc. In addition, the network switch comprises an enclosure enclosing the network switch. The plurality of ports are mounted on the enclosure such that one or more network ports are mounted in a first position on the enclosure (for example in a center position of a front side of the enclosure), one or more network ports are mounted in a setback position on the enclosure (for example on either side of the first position), wherein the one or more network ports mounted in the setback position are in a position that is receded back from the one or more network ports mounted in the first position. The plurality of network ports are also mounted on the enclosure such that one or more network ports are mounted in one or more subsequent setback positions on the enclosure, wherein one or more network ports mounted in each subsequent setback position are mounted in a position that is receded back from one or more network ports mounted in a preceding setback position. For example, the network ports mounted in the first position, the setback position, and the one or more subsequent setback positions may be situated on a triangular shaped front of the network switch, a stair stepped front of the network switch, a curved front of the network switch, or some other shaped front of the network switch that includes successive positions that recede into the network switch. The printed circuit board of the network switch is configured to follow the contour formed by the enclosure such that the circuit traces of the printed circuit board electrically connect the respective connectors of the switching circuit mounted on the printed circuit board to the one or more network ports mounted in the first position, the one or more network ports mounted in the setback position, and the one or more network ports mounted in each of the one or more subsequent setback positions.

According to one embodiment, a communication device with receded ports mounted in successive setback positions includes a plurality of ports, a circuit board that includes a plurality of circuit traces that electrically connect the plurality of ports to respective connectors of a circuit mounted on the circuit board and an enclosure enclosing the communication device. The plurality of ports are mounted on the enclosure such that one or more ports are mounted in a first position on the enclosure, one or more ports are mounted in a setback position on the enclosure that is receded back from the one or more ports mounted in the first position, and one or more ports are mounted in one or more subsequent setback positions on the enclosure that are receded back from one or more ports mounted in a preceding setback position. The circuit board of the communication device is configured to follow the contour of the enclosure such that the circuit traces of the circuit board electrically connect the respective connectors of the circuit mounted on the circuit board to the one or more ports mounted in the first position, the one or more ports mounted in the setback position, and the one or more ports mounted in each of the one or more subsequent setback positions.

According to one embodiment, a circuit board for a communication device with receded ports mounted in successive setback positions includes a plurality of port connectors, a switching circuit, and a plurality of circuit traces that electrically couple respective ones of the port connectors to respective connectors of the switching circuit. The plurality of port connectors are mounted on one or more edges of the circuit board such that one or more port connectors are mounted in a first position, one or more port connectors are mounted in a setback position that is receded back from the one or more port connectors in the first position, and one or more port connectors are mounted in one or more subsequent setback positions that are receded back from one or more port connectors mounted in a preceding setback position. The one or more edges of the circuit board follow a contour formed by the arrangement of the one or more port connectors mounted in the first position, the one or more port connectors mounted in the setback position, and the one or more port connectors mounted in each of the one or more subsequent setback positions. For example, the one or more edges of the circuit board may be on a front side of the circuit board and form a triangular shape, a stair-stepped shape, a curved shape, or some other shape that recedes back from a first position.

As used herein, a "cable" includes any cable, conduit, or line that carries one or more conductors and that is flexible over at least a portion of its length. A cable may include a connector portion, such as a plug, at one or more of its ends.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to devices including a processor, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As communication technologies evolve, communication devices may process communications at increasingly higher speeds and bandwidths. At high speeds, (e.g. 1,000 MHz) slight variations in the amount of time required for a signal to arrive at a switching circuit of a communication device from one port of the communication device compared to another port of the communication device may cause communications to be processed out of order, dropped, or cause various other communication problems. In addition, varying degrees of signal interference and degradation from port to port in a communication device may negatively impact the performance of a communication device. As a signal travels from a port of a communication device to a switching circuit of the communication device it may be susceptible to interference and degradation, such that the length of the distance the signal travels from the port of the communication device to the switching circuit of the communication device may correspond to an amount of interference or degradation of the signal. Also, the amount of time required for the signal to arrive at a switching circuit of a communication device from a port of the communication device may correspond to the distance the signal has to travel from the port of the communication device to the circuit of the communication device.

In order to reduce distances that signals travel from ports of a communication device to a switching circuit of a communication device and to reduce variations in port to switching circuit distances amongst multiple ports of a communication device, an enclosure and corresponding circuit board of a communication device may be configured with receded ports mounted in successive setback positions. The receded ports may include one or more ports in a first position, one or more ports in a setback position, and one or more ports in one or more subsequent setback positions that are electrically connected to a common switching circuit via respective circuit board traces. A communication device with receded ports mounted in successive setback positions may have port to switching circuit distances that are shorter and have less variation from port to port than traditional network switches that comprise a plurality of ports mounted across a flat front face of a network switch.

FIG. 1 illustrates one embodiment of a communication device with receded ports mounted in successive setback positions. A communication device with receded ports mounted in successive setback positions, such as communication device 100 depicted in FIG. 1, may include a plurality of ports, such as ports 114, and a circuit board, such as circuit board 120, that includes a circuit mounted on the circuit board, such as circuit 116. Circuit traces, such as circuit traces 118, may electrically connect respective ports of a communication device with receded ports to a circuit mounted on a circuit board of the communication device. For example, circuit trace 122 electrically connects port 110 of communication device 100 to circuit 116 mounted on circuit board 120 of communication device 100. A communication device with receded ports may also include a power cable, such as power cable 124.

The ports of a communication device with receded ports may be mounted on an enclosure of the communication device with receded ports such that one or more ports are mounted in a first position on the enclosure. For example, ports 102 and 104 are mounted in a first position that is located in the center of the front face of communication device 100. The ports of a communication device with receded ports may be mounted on an enclosure of a communication device with receded ports such that another one or more ports are mounted on the communication device with receded ports in a setback position that is receded back from the first position. For example, ports 106 and 108 are mounted on enclosure 126 in a position that is receded back from ports 102 and 104 mounted in the first position. Additional ports may be mounted in subsequent setback positions that are set back from a preceding setback port position. For example, ports 110 and 112 are mounted in a subsequent setback position that is receded back from ports 106 and 108. As illustrated in FIG. 1, a circuit of a communication device may be centrally located within the communication device such that there are minor variations in the lengths of circuit traces that connect ports of the device to a circuit of the device, such as circuit traces 118, that electrically connected the ports in the first position, the setback position, and the one or more subsequent setback positions to the circuit, such as circuit 116. In some embodiments, a communication device with receded ports may comprise more than one circuit mounted on the circuit board. In some embodiments, the one or more ports in the first position may not be in the center of the front face of a communication device with receded ports.

In FIG. 1, ellipses are used to indicate that a communication device with receded ports, such as communication device 100 may include more ports than depicted in FIG. 1. The number of ports depicted in FIG. 1 is for illustrative purposes and should not be interpreted to limit a communication device with receded ports to comprise a particular number of ports.

Figure 2:
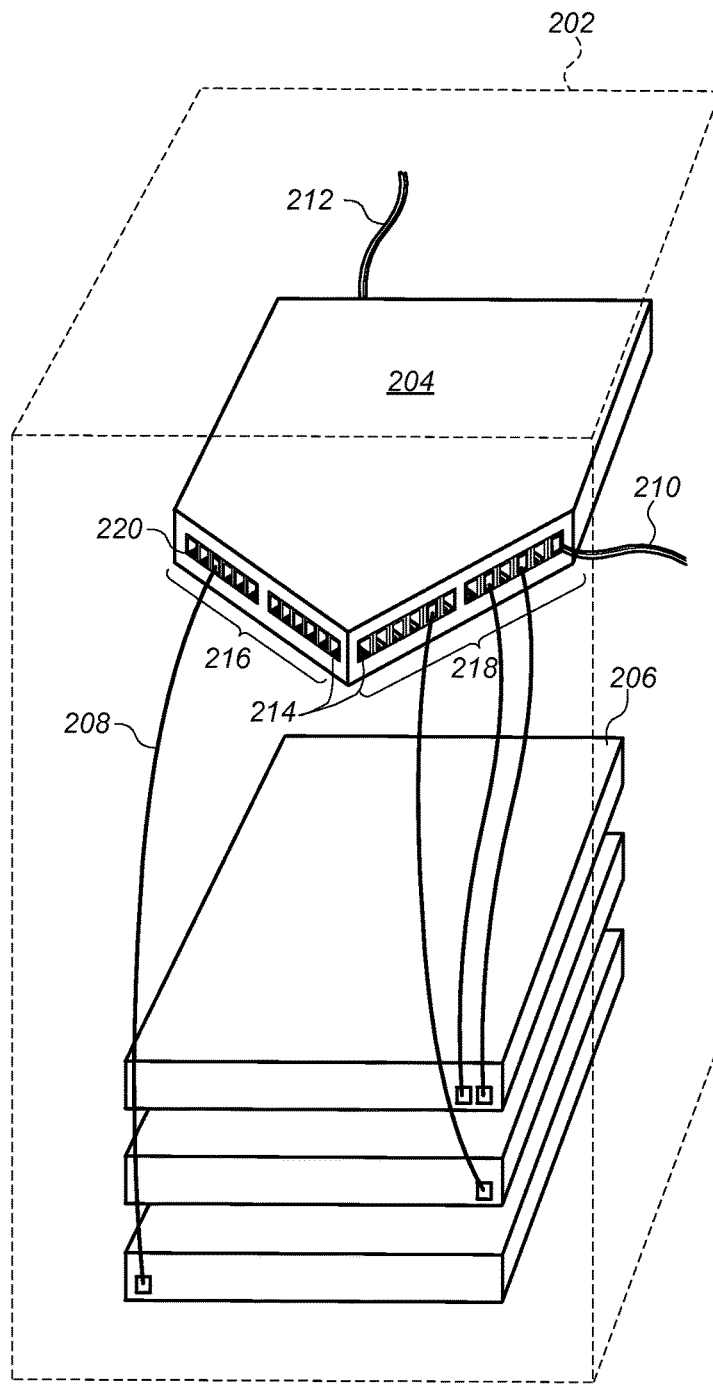
FIG. 2 illustrates a network switch with receded ports mounted in successive setback positions that is mounted in a rack, according to some embodiments.

FIG. 2 illustrates an embodiment of a communication device with receded ports mounted in a rack. A communication device with receded ports, such as the communication device described in FIG. 1, may be a network switch used to switch communications between multiple computing devices mounted in a rack of a data center, such as computing devices 206 in rack 202 in data center 200. In some embodiments, a communication device with receded ports may be used to form a network fabric, wherein the network switch with receded ports is mounted in a rack with other network switches, such as other network switches with receded ports and network switches without receded ports. For example, in some embodiments, computing devices 206 in rack 202 are additional communication devices with receded ports, such as communication device 204.

One or more cables, such as cables 208, may include port connectors, such as a plug, that connects into one of the ports of a communication device with receded ports, such as communication device 204. The one or more cables may be connected at another end to respective computing devices mounted in the rack, such as computing devices 206 mounted in rack 202. A communication device with receded ports mounted in a rack, such as communication device 204 may include a power cable, such as power cable 212, on a back side of the communication device with receded ports. In some embodiments, a communication device with receded ports may not receive power via a power cable, but may receive power along with communication signals via ports of the communication device with receded ports, such as via ports 216 and 218. In some embodiments, a power cable of a communication device with receded ports, such as power cable 212 may be mounted on a different side of the communication device with receded ports.

A communication device with receded ports mounted in a rack may also be connected to a larger network in a datacenter via a port of the plurality of ports of the communication device with receded ports. For example, communication device 204 is connected to a network of data center 200 via cable 210. In FIG. 2, communication device 204 is illustrated with a certain number of ports for simplicity of illustration. However a communication device with receded ports may include more or less ports mounted on the enclosure of the communication device with receded ports (for example, a communication device with receded ports may include 24 ports, 48 ports, or some other number of ports).

A communication device with receded ports may be configured such that the ports of the communication device do not protrude outside of a rack in which the communication device is mounted. For example, communication device 204 may be configured such that ports 214 in the first position do not protrude outside of the rack. Additional ports, such as ports 216 and 218, may be receded into the rack behind the ports in the first position. As discussed below, various configurations of receded ports may be used in a communication device with receded ports. FIG. 2 illustrates a communication device with receded ports where the ports are arranged in a triangular pattern. In some embodiments ports of a communication device with receded ports may be arranged in a stair-step configuration, a curved configuration, or some other configuration. The arrangement of the ports may be selected in part to provide ease of access to the ports. For example, ports 216 and 218 that are in positions that are receded into rack 202 may require a user to reach into a volume that is receded into a rack, such as rack 202, to connect a connector plug of a cable into a port of the communication device with receded ports. Various arrangements of ports may provide easier access to users than other arrangements. A particular arrangement may be selected based at least in part on balancing ease of use against other design criteria.

In some embodiments, a communication device with receded ports may mount in a rack such that the communication device with receded ports may be at least partially removed from the rack while the communication device is being used to switch communications from a plurality of computing devices mounted in the rack. This may allow additional computing devices in a rack to be communicatively coupled to a communication device with receded ports while the communication device is servicing a group of computing devices currently communicatively coupled to the communication device with receded ports. For example, a port closest to the outer edge of a communication device with receded ports, such as port 220, on the far left side of ports 216, may be difficult to access when the communication device is mounted in a rack. In order to more easily access ports or for other reasons, a communication device with receded ports may be at least partially removed from a rack while continuing to service the computing devices communicatively coupled to the communication device with receded ports. For example, communication device 204 may be mounted in rack 202 in such a way that it can be partially moved forward to allow easier access to ports closest to the outer edges of the communication device with receded ports, such as providing easier access to port 220. A power cable, such as power cable 212, may have sufficient slack in the power cable when mounted in a rack such that a communication device with receded ports, such as communication device 204, may at least partially slide forward allowing easier access to the ports of the communication device with receded ports, such as any of ports 216 or 218.

Figure 3:
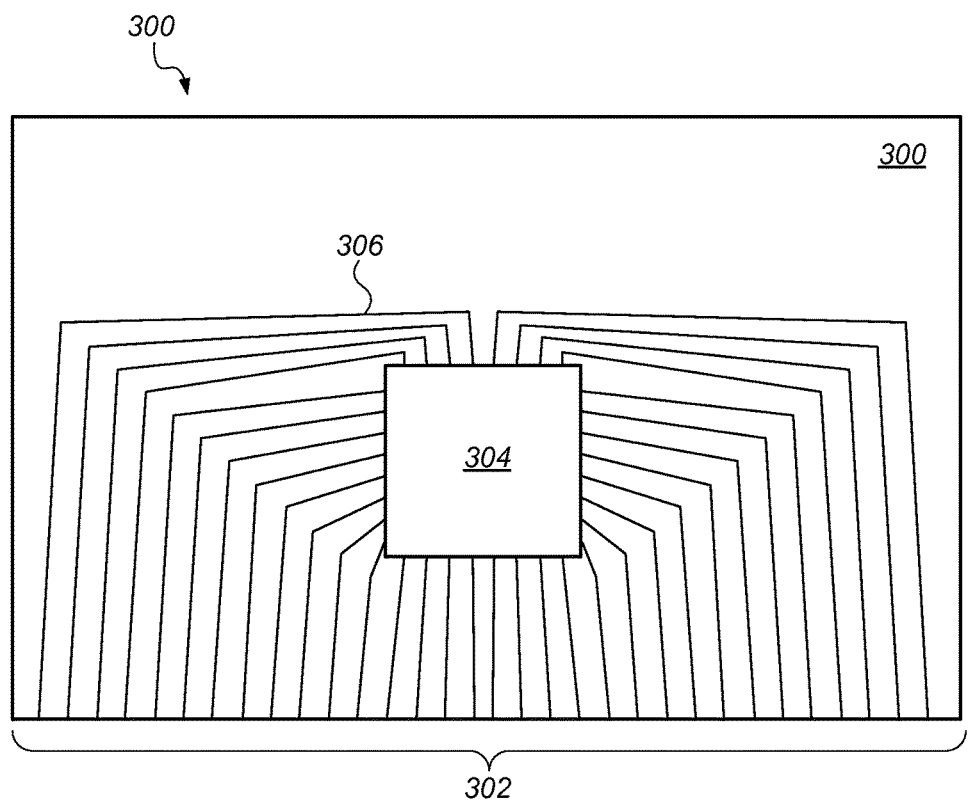
FIG. 3 illustrates an example of a circuit board for a communication device without receded ports.

FIG. 3 illustrates a circuit board for a communication device without receded ports. A communication device that includes a circuit board, such as circuit board 300, may include ports mounted on a flat front face of the communication device without ports mounted in receded positions. The distances from different port connectors on the edge of a circuit board without receded ports to a switching circuit mounted on the circuit board, such as the distance from port connectors 302 to circuit 304 mounted on circuit board 300, may cause there to be significant differences in the lengths of respective circuit traces from port to port in a communication device without receded ports, such as circuit traces 306 that connect port connectors 302 to switching circuit 304 of circuit board 300.

Figure 4:
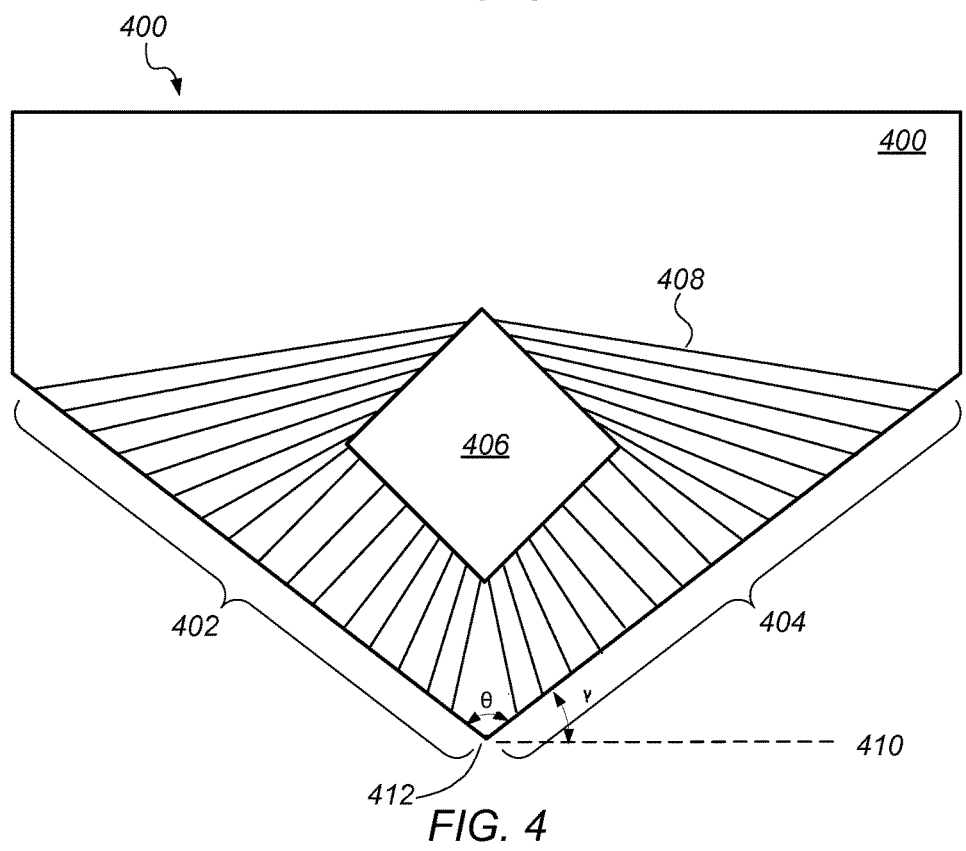
FIG. 4 is a schematic illustrating a circuit board with port connectors mounted in successive setback positions, according to some embodiments.

In contrast to FIG. 3, FIG. 4 illustrates a circuit board for a communication device with receded ports, according to some embodiments. As can be seen in FIG. 4, subsequent ones of port connectors, such as port connectors 402 and 404, may be receded back so that subsequent port connectors that are further from the center of the circuit board where a circuit is mounted are also set back from a first front position of the circuit. For example, circuit board 400 includes switching circuit 406 horizontally centered on circuit board 400. Port connectors 402 and 404 are set back from a first position aligned with the placement of switching circuit 406 on circuit board 400. In this way, the distance from the port connectors on the edge of a circuit board, such as circuit board 400, to a circuit mounted on the circuit board, such as switching circuit 406, may be less than a distance from comparably situated port connectors in a circuit board for a communication device without receded ports, such as in circuit board 300. Also, as can be seen in FIG. 4, there may be less variation in the lengths of circuit traces on a circuit board for a communication device with receded ports, such as circuit traces 408 of circuit board 400 as compared to circuit traces 306 in circuit board 300. Because the lengths of the longest circuit traces in communication devices with receded ports, such as circuit traces 408 of circuit board 400, may be shorter than the longest circuit traces in communication devices without receded ports, such as circuit traces 306 of circuit board 300, the difference between the longest circuit traces and the shortest circuit traces may also be less in a communication device with receded ports. By having less variation in circuit trace lengths, a communication device with receded ports may experience less variations in a time delay between when signals associated with different ports reach a circuit of the communication device with receded ports, such as circuit traces 408 reaching switching circuit 406 of circuit board 400. In turn, less variations in time delays for signals received at different ports of a communication device with receded ports may reduce incidents of communications being processed out of order, dropped, or various other communication problems. Also signal interference and degradation may correspond to the distance a signal has to travel in a communication device. So that by reducing the overall length of circuit traces from ports of a communication device to a circuit of a communication device, a communication device with receded ports may experience less signal interference and/or degradation than a communication device without receded ports.

In some embodiments, such as circuit board 400 illustrated in FIG. 4, port connectors of a circuit board for a communication device with receded ports may be situated in a triangular pattern. For example, ports 402 and 404 of circuit board 400 that is configured to go into a communication device with receded ports are arranged in a triangular pattern on two edges of a front side of circuit board 400. Communication devices with receded ports, such as a corresponding communication device that includes circuit board 400, may provide additional surface area along a front side of the communication device with receded ports to allow additional ports to be mounted on the communication device with receded ports as compared to communication devices that include ports mounted on a single flat front face of the communication device without receded ports. Or, communication devices with receded ports may include greater spacing between ports on a front side of communication devices with receded ports so that circuit traces from the more spaced out ports are also more spaced out. For example, circuit traces 408 of circuit board 400 have more space between adjacent circuit traces than circuit traces 306 of circuit board 300. This may result in less signal interference due to signals flowing through adjacent circuit traces interfering with each other.

In some embodiments, ports of a communication device with receded ports may be mounted in a triangular pattern on port connectors of a circuit board, such as circuit board 400, that form a triangular pattern and meet at an angle such that the two edges are at least partially aligned with edges of a switching circuit mounted on the circuit board, for example port connectors 402 and 404 along corresponding edges of circuit board 400 meet at an angle theta such that the two edges are at least partially aligned with the edges of switching circuit 406. In some embodiments, theta may range from about 60 to about 125 degrees. In some embodiments, two edges of a circuit board that form a triangular pattern may meet at other angles. Each of the two edges of a circuit board that form a triangular pattern may be recessed from a front side of a rack, in which a communication device containing the circuit board is to be mounted, such that the two edges form an angle gamma with the front side of the rack. For example, port connectors 404 are set back at an angle gamma of about 45 degrees relative to reference line 410 representing a front side of a rack in which a communication device with receded ports that includes circuit board 400 may be mounted. In some embodiments, a circuit mounted on a circuit board for a communication device with receded ports, such as switching circuit 406 mounted on circuit board 400, may be oriented such that the circuit is at an angle with a front or back side of a rack in which a communication device with receded ports comprising the circuit is to be mounted, where the angle gamma is 45 degrees or some other angle. In some embodiments a switching circuit mounted on a circuit board for a communication device with receded ports may be oriented such that a corner of the circuit is pointing toward a first position of the circuit board about which additional port connectors are mounted in setback positions. For example, switching circuit 406 mounted on circuit board 400 is oriented such that a corner of switching circuit 406 points toward front portion 412. In some embodiments, a circuit board with edges that meet in a triangular pattern that form an angle theta may include a switching circuit mounted on the circuit board with a corner pointing towards the first position of the circuit board where the two edges meet such that the edges of the circuit are at least partially aligned with the edges of the circuit board. For example, switching circuit 406 mounted on circuit board 400 has a square shape (or in some embodiments may have a rectangular shape) and the edges of circuit board 400 that comprise port connectors 402 and 404 meet at angle theta. Because the edges of circuit board 400 and switching circuit 406 recede back at a similar angle, the edges of circuit board 400 are at least partially aligned with the edges of switching circuit 406 mounted on circuit board 400. The circuit board with a circuit mounted in an orientation aligned with the edges of the circuit board may further reduce the length of circuit traces as compared to circuit boards for communication devices without receded ports, such as circuit board 300 described in FIG. 3.

In some embodiments, circuit boards that include port connectors situated in a triangular pattern may include circuit boards with two edges that meet at various other angles and may include one or multiple circuits mounted on the various circuit boards. Circuits may be mounted on the circuit boards in various other orientations. Different variations of circuit boards may be configured to be used in a communication device with receded ports.

Figure 5:
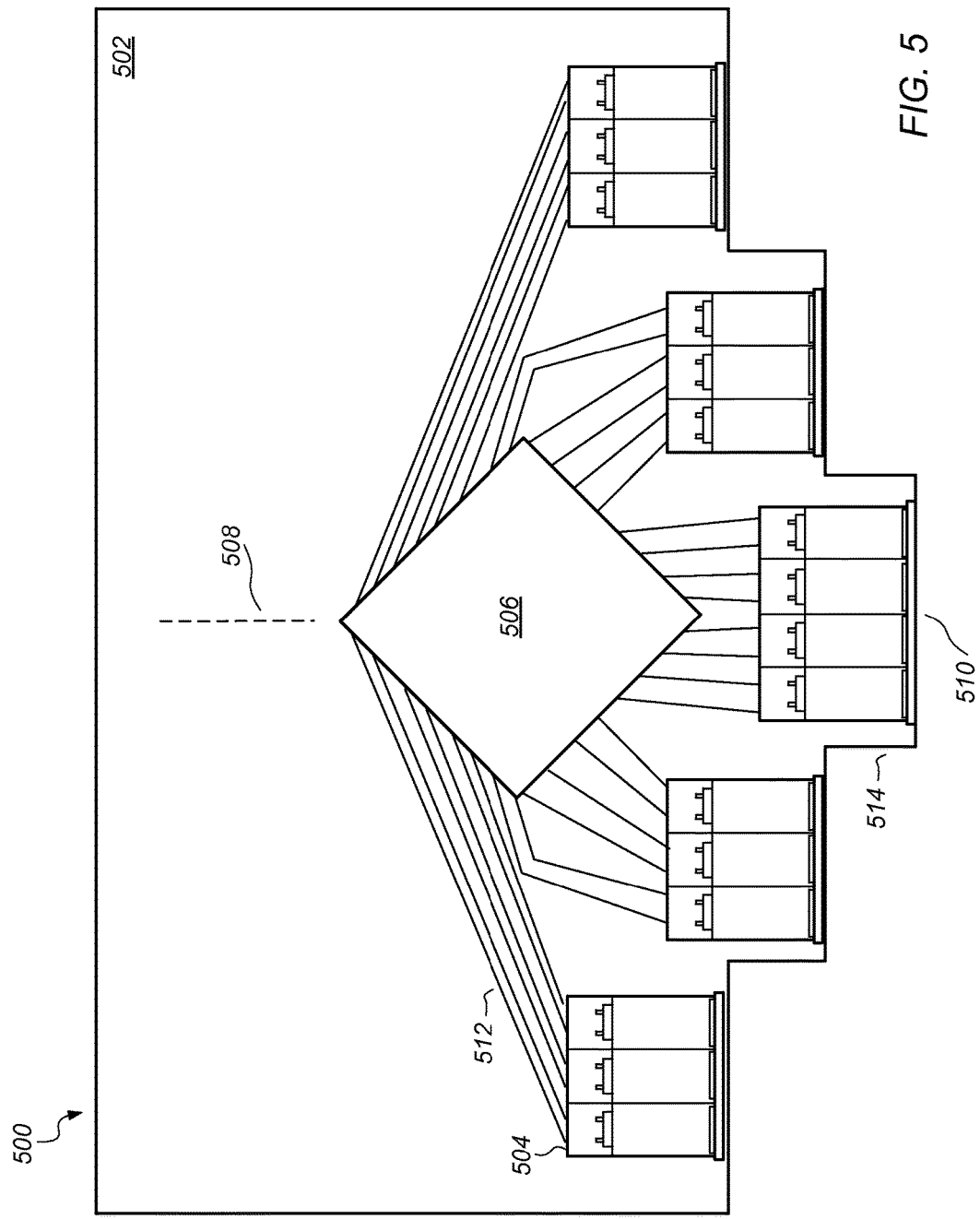
FIG. 5 is a schematic illustrating a communication device with ports mounted in successive setback positions situated in a stair-step pattern, according to some embodiments.

FIG. 5 illustrates a schematic of a communication device with receded ports situated in a stair-step pattern, according to some embodiments. Like a communication device with receded ports situated in a triangular pattern as described in regard to FIGS. 1 and 2, a communication device with receded ports situated in a stair-step pattern may include a circuit board with shorter circuit traces between port connectors and a circuit mounted on the circuit board than a circuit board for a communication device without receded ports such as circuit board 300. For example, circuit traces 512 electrically connecting ports 504 to circuit board 506 may include shorter circuit traces than corresponding circuit traces in a circuit board for a communication device without receded ports, such as circuit board 300 described in FIG. 3. In some embodiments, one or more ports of a communication device with receded ports may be mounted in a first position, such as first position 510, one or more ports may be mounted in a setback position, and one or more ports may be mounted in one or more subsequent setback positions, where each position is a stair step receded back from a previous stair step. In some embodiments, signal traces from port connectors to a circuit mounted on a circuit board of a communication device with receded ports situated in a stair step pattern (or other pattern) may be symmetrical about the first position. For example, circuit traces 512 of circuit board 502 are symmetrical about axis 508 that runs through first position 510 of communication device 500. In some embodiments, circuit traces of a circuit board of a communication device with receded ports may be asymmetrical. For example, in some embodiments a communication device with receded ports situated in a stair-step pattern may include more ports mounted in more subsequent positions on one side of a first position, such as first position 510, than on another side of a first position, such as first position 510. In some embodiments, a communication device with receded ports may include more than one circuit, such as circuit 506. The multiple circuits may be mounted asymmetrically or symmetrically and corresponding circuit traces, such as circuit traces 512, of a circuit board that comprises multiple circuits mounted on the circuit board may be asymmetrical or symmetric.

FIG. 5 illustrates a communication device with receded ports situated in a stair-step pattern where the ports are mounted parallel to a front side of the communication device. In some embodiments, ports on a communication device with receded ports may be mounted such that the ports are not parallel to a front side of the communication device. For example, a portion of ports 504, may be mounted in position 514 that is perpendicular to a front side of communication device 500. In some embodiments, any of the communication devices with receded ports described in FIGS. 1-2 and 4-10 may include ports that are mounted parallel to a front side of the communication device and/or ports that are mounted at an angle relative to the front side of the communication device, such as ports that are mounted perpendicular to the front side of the communication device.

Figure 6:
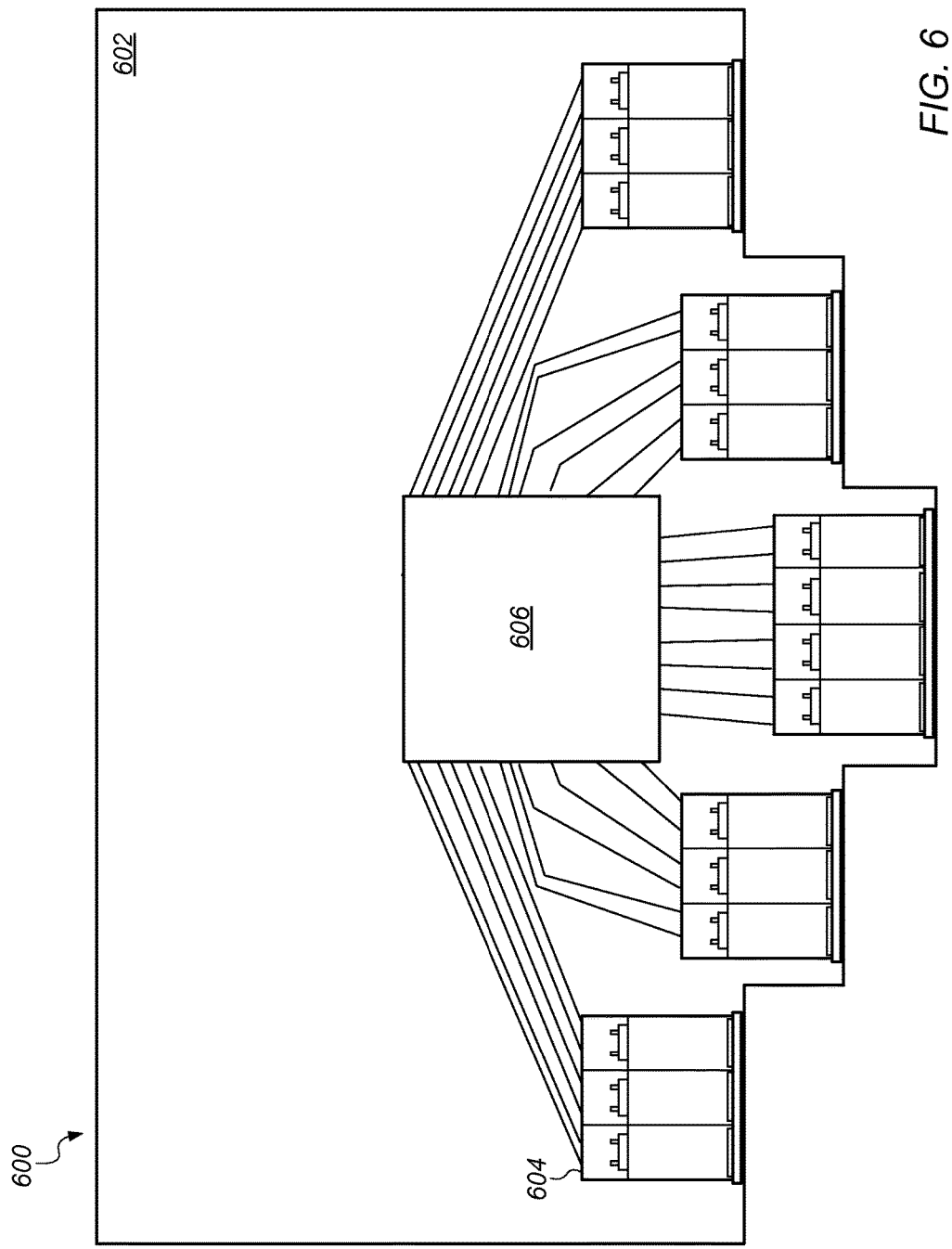
FIG. 6 is a schematic illustrating a communication device with ports mounted in successive setback positions situated in a stair-step pattern, according to some embodiments.

FIG. 6 illustrates a schematic of a communication device with receded ports situated in a stair-step pattern, according to some embodiments. A communication device with receded ports may be configured in a stair-step pattern with a circuit aligned with a back edge of the communication device with receded ports, such as circuit 606 of communication device 600. Any of the communication devices described in FIGS. 1-10 may include a circuit oriented such that it is aligned with a back edge of a communication device with receded ports. Any of the communication devices with receded ports described in FIGS. 1-10 may include a circuit oriented such that the circuit makes an angle with a back edge of a communication device with receded ports. In some embodiments, a communication device with receded ports may include multiple circuits electrically connected to port connectors via circuit traces. Depending on the number of ports to be included in a communication device with receded ports, the number of circuits to be included in a communication device with receded ports, and other design criteria, different circuit placements on a circuit board of the communication device with receded ports may be desirable, also different orientations of one or more circuits on a circuit board may be desirable based on similar considerations. In some embodiments a communication device with receded ports may include various numbers of ports, various numbers of circuits, and the one or more circuits of a communication device with receded ports may be orientated relative to a back edge of the communication device in various orientations depending on design criteria of the communication device with receded ports.

Figure 7:
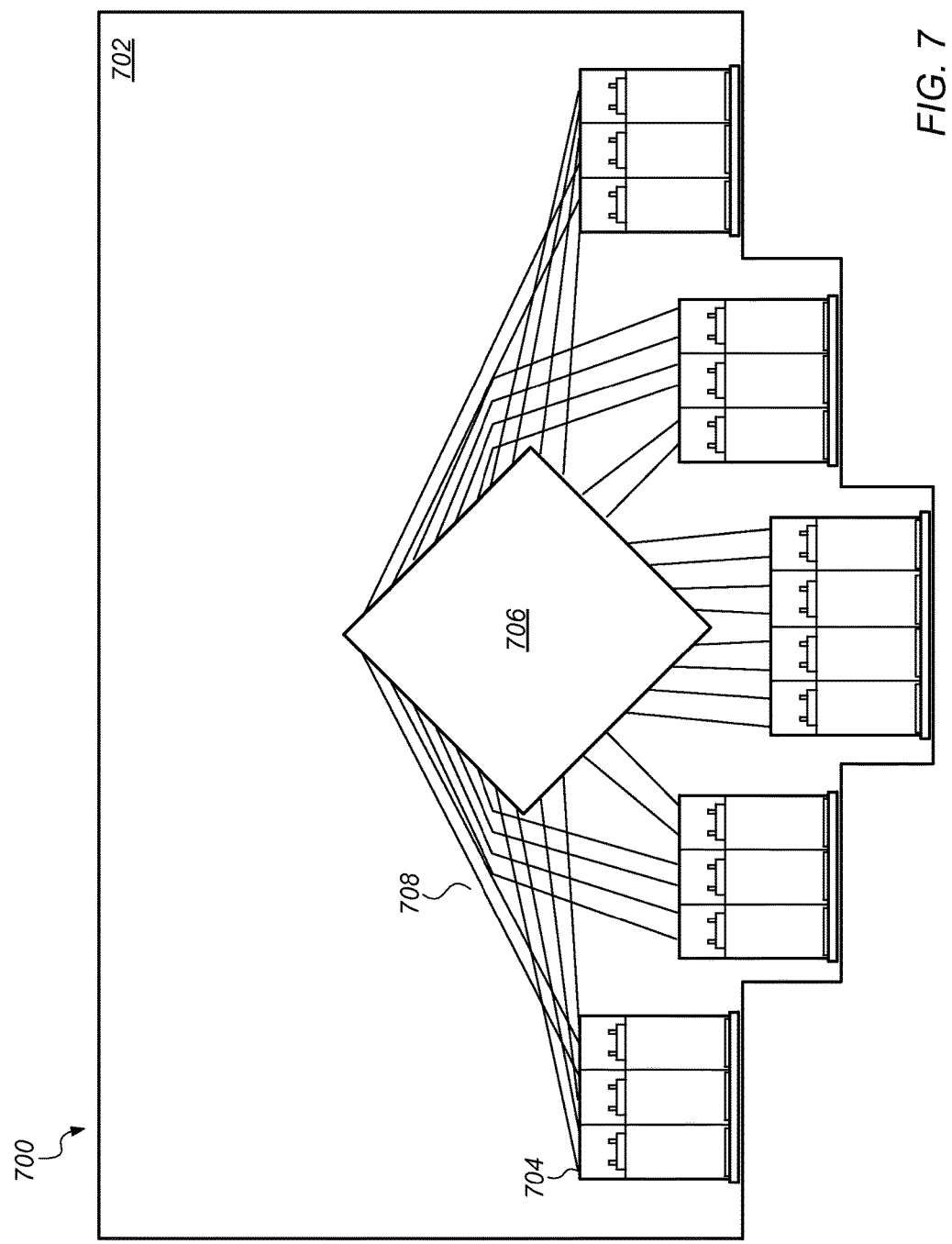
FIG. 7 is a schematic illustrating a communication device with ports mounted in successive setback positions situated in a stair-step pattern, according to some embodiments.

In some embodiments, a communication device with receded ports may include circuit traces at multiple layers of a circuit board. For example, FIG. 7 illustrates one embodiment of a communication device with receded ports that includes a circuit board with circuit traces at multiple layers of the circuit board. In FIG. 7, circuit traces 708 electrically connect ports 704 to circuit 706 and overlap one another indicting circuit traces at multiple layers of circuit board 702. In some embodiments, a communication device with receded ports may provide additional surface area on a front side of a communication device to mount ports such that signal traces of a circuit board of the communication device with receded ports may be mounted on a single layer of the circuit board.

Figure 8:
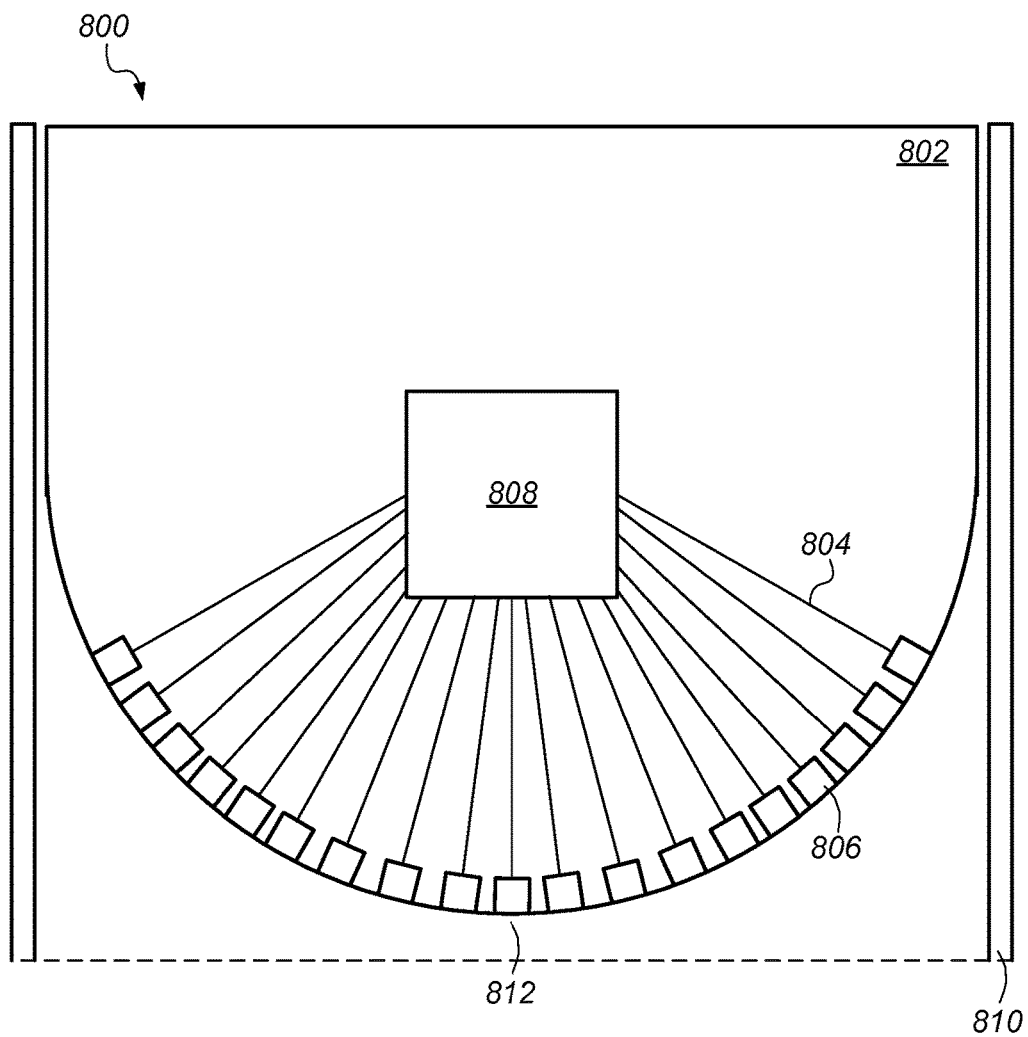
FIG. 8 is a schematic illustrating a communication device with ports mounted in successive setback positions situated in a curved pattern, according to some embodiments.

In some embodiments, ports of a communication device with receded ports may be situated in a curved pattern. For example, FIG. 8 illustrates communication device 800 that includes ports 806 situated in a curved pattern and electrically connected to circuit 808 via circuit traces 804. A first position of a communication device with receded ports, may be configured to not protrude from a rack in which the communication device is to be mounted. For example, first position 812 of communication device 802 does not protrude outside of rack 810. A communication device with receded ports may be configured such that the one or more ports mounted in the setback position and the one or more ports mounted in each of the one or more subsequent setback positions may recede into a rack, for example ports 806 of communication device with receded ports 802 recede into rack 810. Any of the communication devices with receded ports described in FIGS. 1-10 may be configured such that a first position of the communication device does not protrude outside of a rack in which the communication device is to be mounted and such that one or more ports mounted in a setback position and one or more ports mounted in one or more subsequent setback positions are receded into a rack when the communication device is mounted into a rack.

Figure 9:
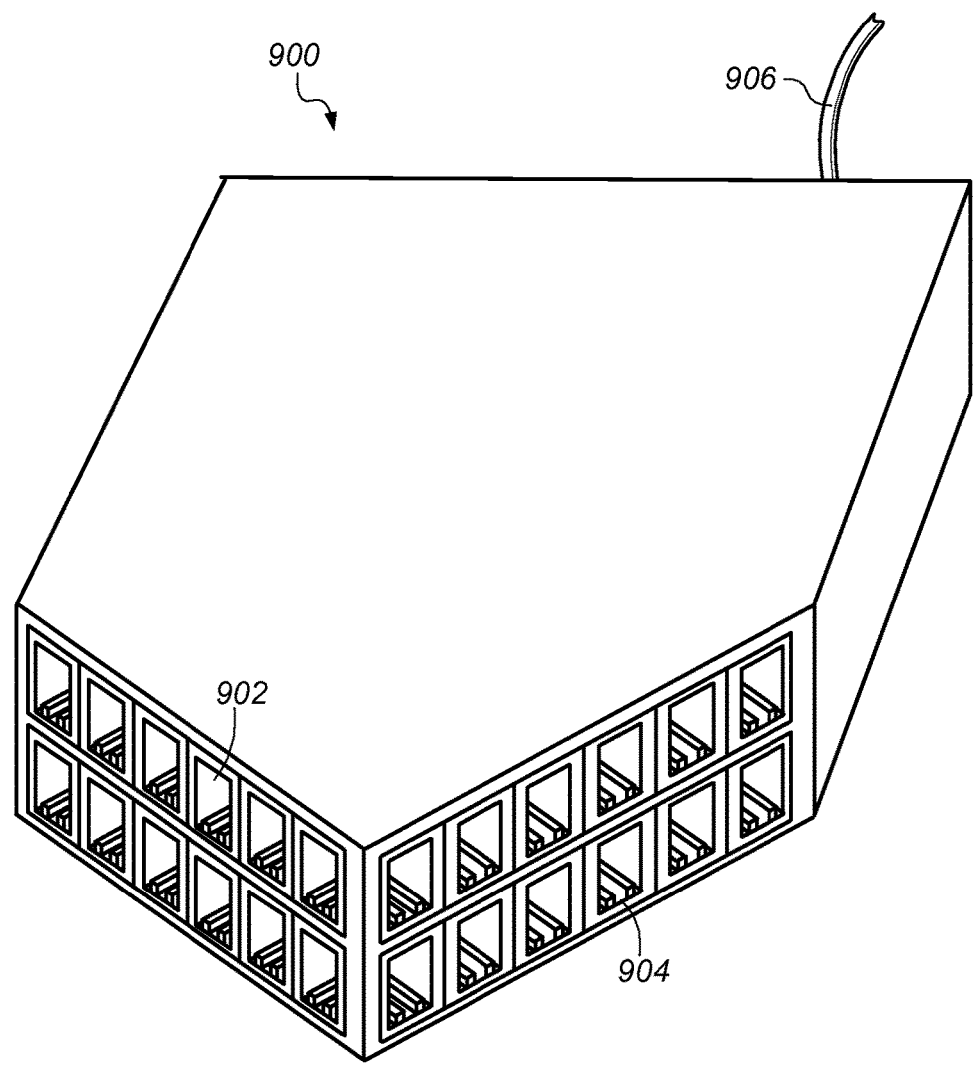
FIG. 9 illustrates a communication device with ports mounted in successive setback positions situated on multiple levels, according to some embodiments.

In some embodiments, a communication device with receded ports may include multiple levels of receded ports. For example, FIG. 9 illustrates a commination device with multiple layers of receded ports, according to some embodiments. A communication device, such as communication device 900, may include ports in on one or more top layers such as ports in top layer 902, and may include ports in one or more additional layers, such as ports in additional layer 904. In some embodiments, a communication device with receded ports, such as communication device 900, may include a power cable on a back side of the communication device, such as power cable 906. Any of the communication devices with receded ports described in FIGS. 1-10 may include ports at multiple layers. While, FIG. 9 depicts a communication device with receded ports arranged in two layers, a communication device with receded ports may include ports arranged in more or less layers.

Figure 10:
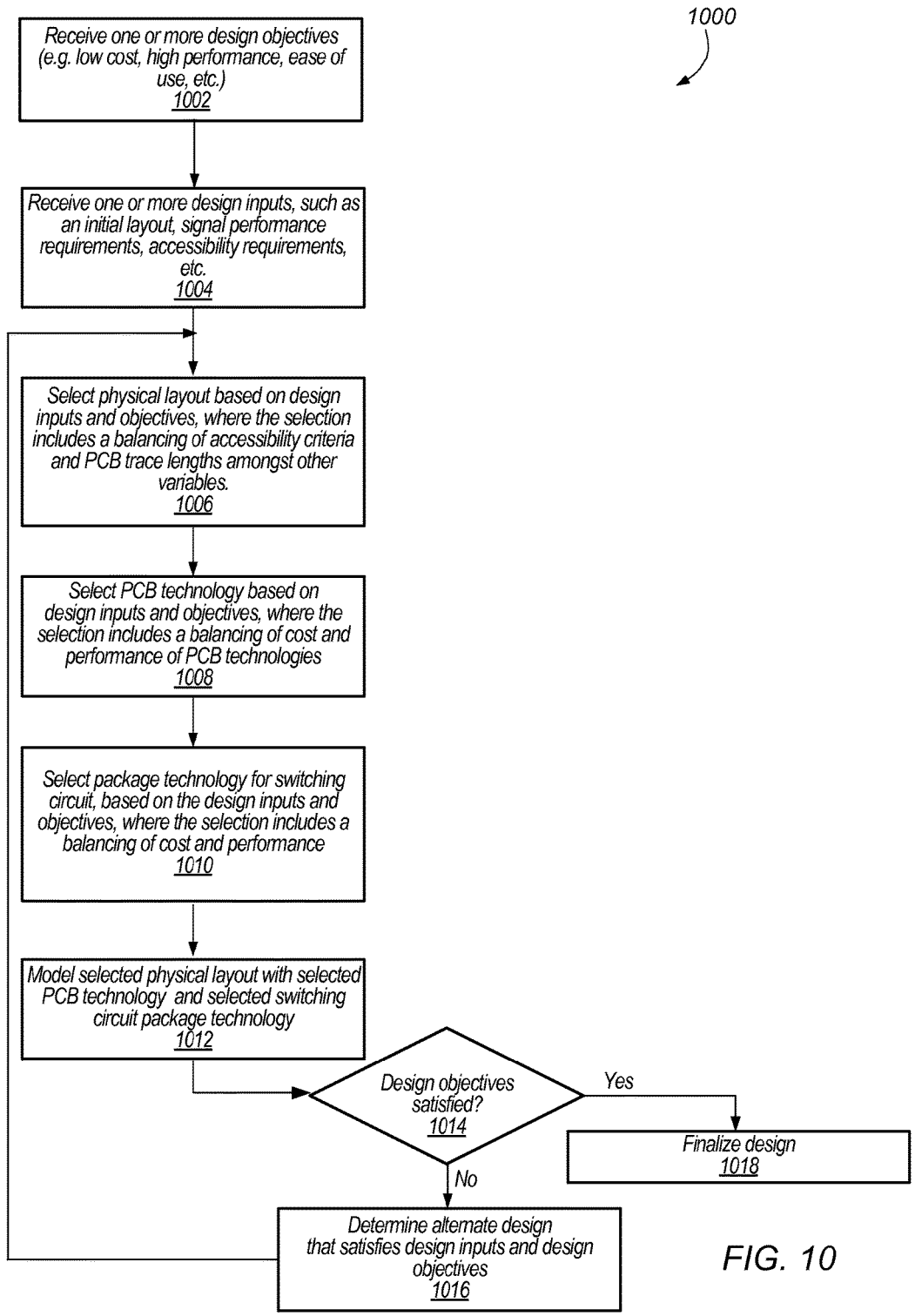
FIG. 10 depicts a design process for designing a communication device with ports mounted in successive setback positions, according to some embodiments.

FIG. 10 illustrates a flow-diagram of a process for designing a communication device with receded ports, according to some embodiments. At 1002 one or more design objectives for a communication device with receded ports are received. The design objects may include a design objective based on cost, for example a design objective may be to design a communication device with receded ports that meets a set of performance requirements while minimizing a cost to manufacture. The design objectives may include a design objective based on performance, for example a design objective may be to design a communication device with high signal performance. The design objectives may include ease of use, for example a design objective may be that a communication device be easily accessible to a user. Various considerations may be used to determine an ease of use score such as number of ports, spacing of ports, angle of ports relative to a front side of the device, angle of receded edges of the communication device with receded ports, depth of a recess of ports of a communication device with receded ports, etc. More than one design objectives may be used in designing a network switch with receded ports. In designs that include more than one design objective, design objectives may be weighted, so that one design objective has more influence on the design that is selected than another design objective. For example, design objectives related to cost and performance may be received for a communication device with receded ports that is to be designed. Performance may be weighted on a 10 point scale to be 9 out of 10, while cost may be weighted on a 10 point scale as 7 out of 10. A design process receiving these design objectives may preferentially select a design with higher performance over a lower cost design. In some embodiments, a process for designing a communication device with receded ports may include more or less design objectives. The design objectives described above are for illustrative purposes. A person skilled in the art will understand that various other design objectives may be included in a process for designing a communication device with receded ports.

At 1004, one or more design inputs are received. Design inputs may include performance requirements, initial layouts, or other inputs. For example a design requirement may be that signals must be received at a circuit of the communication device within a threshold amount of time from being received at a port of the communication device. In another example, performance requirements may include that signal degradation cannot exceed a threshold amount. In yet another example, performance requirements may be that receded ports of a communication device with receded ports may not be receded into the device more than a threshold distance from a front most surface of the device. In some embodiments, performance requirements may include conditions that must be met in order for a design to be successful, while design objectives may be used to select a design from a group of designs that all meet the design performance requirements, but some of the designs of the group may be determined to be better than other designs of the group meeting the performance requirements. The design inputs may also include an initial layout. For example, an initial layout may be provided to a design process for designing communication devices with receded ports and the design process may iteratively alter the initial layout to test if alterations better meet the one or more design objectives received by the design process. In some embodiments, a layout for a communication device without receded ports may be provided as an initial layout and a design process, such as design process 1000, may determine how the initial layout for a communication device without receded ports can be improved to better meet the received design objectives and performance requirements and determine a design of a communication device with receded ports incorporating these improvements.

At 1006 a physical layout is selected based on the received design objectives and design inputs. A first iteration physical layout may be based on a changing a received initial layout with one or more alterations based on balancing the one or more design objectives within the received performance requirements. In some embodiments, a design process for designing communication devices with receded ports may include a default layout that is used as an initial layout instead of receiving an initial layout. A physical layout may be selected based at least in part on balancing the length of the circuit traces in the physical layout against ease of access of the ports in the communication device with receded ports described by the physical layout. In some embodiments, other considerations may be used in selecting a physical layout.

At 1008, a printed circuit board technology (PCB technology) may be selected based on the received design inputs and design objectives. Selecting a PCB technology may include a balancing of costs of various PCB technologies against the performance of the PCB technologies. PCB technologies may include different materials of construction for printed circuit boards, different materials used for circuit tracing on the printed circuit board, different manufacturers of PCB components, etc. PCB technologies that have higher performance, such as faster signal transmission speeds and/or less signal interference or degradation, may cost more than PCB technologies that have lower performance. In some embodiments, selecting a PCB technology may include selecting a multi-layer PCB, selecting how many layers to include in a multilayer PCB, or selecting a single layer PCB.

At 1010, a package technology for a switching circuit technology is selected. Selecting a package technology may include a balancing of costs versus performance. In some embodiments, in addition to minimizing a length of a circuit trace from a port connector to a switching circuit mounted on a PCB, a length of travel within a switching circuit packaging may be minimized. In some cases, a distance a signal travels after arriving at a switching circuit, such as an ASIC (application specific integrated circuit), to a chip within the packaging of a switching circuit, such as an ASIC, may have a greater impact on performance than a similar distance travelled from a port connector to the switching circuit via circuit traces of a PCB. Various package technologies for switching circuits that may be selected include square shaped ASICs, rectangular shaped ASICs, ASICs with pins mounted around a perimeter of the ASIC, ASICs with an array of contacts extending out of the ASIC on a bottom side. In some embodiments, a merchant silicon ASIC may be selected. In some embodiments, an ASIC may be specially designed based on the design inputs and design objectives. In some embodiments, other package technologies may be selected.

At 1012, a model is developed using the selected physical layout, the selected PCB technology, and the selected package technology. In some cases, a design process for designing communication devices with receded ports may include performance properties for various PCB technologies based on lengths of PCB traces using particular ones of the various PCB technologies. This may allow determining performance of the selected physical layout and PCB technology based on the already determined performance properties of the various PCB technologies. In some cases, a design process for designing communication devices with receded ports may include performance properties for various switching circuit package technologies, which may allow performance to be modeled based on known performance properties for different switching circuit package technologies.

At 1014, it is determined if the selected physical layout, selected PCB technology, and the selected switching circuit package technology satisfy the design objectives. In some situations it may be determined that one or more of the design objectives are not met by the selected physical layout, selected PCB technology, and selected switching circuit package technology, if the design objectives are not met, an alternate design may be selected at 1016 and the design process may repeat starting with selecting a physical layout at 1006. In some embodiments, a design process for designing a communication device with receded ports may use an iterative algorithm or some other manner for selecting a design that best meets the design objectives and performance requirements. For example, an iterative algorithm may assign a different score to each design objective, weight each design objective score based on weightings received in 1002 and determine an overall design score. The iterative algorithm may iteratively alter the selected physical layout, switching circuit package technology and/or PCB technology until subsequent changes do not improve the overall design score for a threshold number of iterations. When it is determined that the design objectives are satisfied with the selected physical layout, selected switching circuit package technology, and selected PCB technology (for example, the iterative algorithm determines that additional changes to the design do not improve the overall design score) the design of the communication device with receded ports may be finalized at 1018. Until it is determined that the selected physical layout, selected switching circuit package technology, and selected PCB technology satisfy the design objectives, slight changes may be made to determine alternate designs at 1016 and the design process may repeat starting at 1006.

The additional changes to the design may include changing an angle at which the ports in the setback and subsequent setback positions are receded, changing a pattern in which the ports in the setback and subsequent setback positions are receded (e.g. a triangular pattern, a stair-stepped pattern, a curved pattern, etc.). In some embodiments, the additional changes to the design may include changing the depth of recession of the ports in the setback and subsequent setback positions (e.g. changing a distance of recession between the ports in the first position and the ports in the setback and subsequent setback positions). In some embodiments, the additional changes to the design may include changing an orientation of a switching circuit, such as an ASIC. For example a switching circuit may be oriented such that the edges of the switching circuit are partially aligned with the ports in the setback position and the subsequent setback positions. In some embodiments, the additional changes to the design may include changing other variables.

A communication device with receded ports may be designed with more degrees of freedom than a communication device without receded ports. For example, in designing a communication device without receded ports, the ports may be mounted across a flat front face such that an angle formed by the ports, a pattern (e.g. triangular, stair-stepped, etc.) formed by the ports, or an amount of recession of the ports cannot be adjusted in designing the communication device.

In some embodiments, the design process described in FIG. 10 may be implemented in software executed on a computer system storing program instructions executable to perform the process described in FIG. 10.

The various methods as illustrated in the Figures and described herein represent exemplary embodiments of methods. The order of methods may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a rack;
   a plurality of computing devices mounted in the rack; and
   a network switch mounted in the rack, wherein the network switch comprises:
      a plurality of network ports, wherein respective ones of the plurality of network ports are communicatively coupled to respective ones of the plurality of computing devices in the rack;
      a printed circuit board (PCB) comprising a plurality of circuit traces that electrically connect respective ones of the ports to respective connectors of a switching circuit mounted on the printed circuit board, wherein the switching circuit is configured to switch communications received via the plurality of network ports; and
      an enclosure enclosing the network switch, wherein the plurality of network ports are mounted on the enclosure such that:
         one or more network ports are mounted in a first position on the enclosure;
         one or more network ports are mounted in a setback position on the enclosure, wherein the one or more network ports mounted in the setback position are in a position that is receded back from the one or more network ports mounted in the first position; and
         one or more network ports are mounted in one or more subsequent setback positions on the enclosure, wherein one or more network ports mounted in each subsequent setback position are mounted in a position that is further receded back from the one or more network ports in the first position and receded back from one or more network ports mounted in a preceding setback position;
      wherein the printed circuit board is configured to follow a contour of the enclosure such that the circuit traces of the printed circuit board electrically connect the respective connectors of the switching circuit mounted on the printed circuit board to the one or more network ports mounted in the first position, the one or more network ports mounted in the setback position, and the one or more network ports mounted in each of the one or more subsequent setback positions.

2. The system of claim 1, wherein the plurality of computing devices mounted in the rack are a plurality of additional network switches, wherein the network switch and the plurality of additional network switches form a network fabric.

3. The system of claim 1, wherein the network switch is mounted in the rack such that a back side of the network switch is parallel with a rear plane of the rack, and wherein the switching circuit is mounted on the printed circuit board at a skewed angle relative to the back side of the network switch.

4. The system of claim 1, wherein the network switch is configured to mount in the rack such that the network switch can be at least partially removed from the rack while the switching circuit is switching communications received via the plurality of network ports and without uncoupling the plurality of network ports communicatively coupled to the plurality of computing devices in the rack.

5. The system of claim 1, wherein the one or more network ports mounted in the setback position and the one or more ports mounted in the one or more subsequent setback positions are receded into the rack.

6. A communication device comprising:
   a plurality of ports;
   a circuit board comprising a plurality of circuit traces that electrically connect respective ones of the plurality of ports to respective connectors of a component mounted to the circuit board, wherein the component is configured to switch communications received via the plurality of ports;
   an enclosure enclosing the communication device, wherein the plurality of ports are mounted on the enclosure such that:
      one or more ports are mounted in a first position on the enclosure;
      one or more ports are mounted in a setback position on the enclosure, wherein the one or more ports mounted in the setback position are in a position that is receded back from the one or more ports mounted in the first position; and
      one or more ports are mounted in one or more subsequent setback positions on the enclosure, wherein one or more ports mounted in each subsequent setback position are mounted in a position that is further receded back from the one or more ports in the first position and receded back from one or more ports mounted in a preceding setback position;
   wherein the circuit board is configured to follow a contour of the enclosure such that the circuit traces of the circuit board electrically connect the respective connectors of the component mounted to the circuit board to the one or more ports mounted in the first position, the one or more ports mounted in the setback position, and the one or more ports mounted in each of the one or more subsequent setback positions.

7. The communication device of claim 6, wherein the one or more ports mounted in the first position, the one or more ports mounted in the setback position, and the one or more ports mounted in each of the subsequent setback positions are situated in a triangular pattern.

8. The communication device of claim 6, wherein the one or more ports mounted in the first position, the one or more ports mounted in the setback position, and the one or more ports mounted in each of the subsequent setback positions are situated in a curved pattern.

9. The communication device of claim 6, wherein the one or more ports mounted in the first position, the one or more ports mounted in the setback position, and the one or more ports mounted in each of the subsequent setback positions are situated in a stair-step pattern.

10. The communication device of claim 6, wherein the communication device is configured to mount in a rack such that a back side of the communication device is parallel to a rear plane of the rack, wherein the component is mounted to the circuit board at an angle that is skewed relative to the back side of the communication device.

11. The communication device of claim 6, wherein the component is mounted to the circuit board such that an axis passing through opposing corners of the component is orientated perpendicular to a face of the communication device comprising the one or more ports mounted in the first position.

12. The communication device of claim 6, wherein the plurality of ports are mounted on the enclosure such that the ports mounted in the setback position and the one or more subsequent setback positions are mounted symmetrically about the one or more ports mounted in the first position and wherein the circuit traces that connect the plurality of ports to the respective connectors of the component are symmetric about an axis passing through the first position.

13. The communication device of claim 6, wherein the circuit traces that connect the plurality of ports to the respective connectors of the component are on a single layer of the circuit board.

14. The communication device of claim 6, wherein the communication device is a network switch configured to switch communications received via the plurality of ports as part of a network fabric comprising a plurality of network switches mounted in a rack.

15. A circuit board comprising:
a plurality of port connectors;
a switching circuit; and
a plurality of circuit traces that electrically couple respective ones of the port connectors to respective connectors of the switching circuit,
wherein, the plurality of port connectors are mounted on one or more edges of a plurality of edges of the circuit board such that:
one or more port connectors are mounted in a first position; and
one or more port connectors are mounted in a setback position, wherein the one or more port connectors mounted in the setback position are in a position that is receded back from the one or more port connectors mounted in the first position; and
one or more port connectors are mounted in one or more subsequent setback positions, wherein one or more port connectors mounted in each subsequent setback position are mounted in a position that is further receded back from the one or more port connectors mounted in the first position and receded back from one or more port connectors mounted in a preceding setback position.

16. The circuit board of claim 15, wherein the one or more edges of the circuit board comprise two edges that form a triangular shape.

17. The circuit board of claim 16, wherein the two edges that form the triangular shape meet at an angle between about 60 degrees and about 125 degrees.

18. The circuit board of claim 15, wherein the one or more edges of the circuit board comprise a plurality of edges that form a stair-step shape.

19. The circuit board of claim 15, wherein the plurality of circuit traces that connect the plurality of port connectors to the respective connectors of the switching circuit are on a single layer of the circuit board.

20. The circuit board of claim 15, wherein the plurality of circuit traces that connect the plurality of port connectors to the respective connectors of the switching circuit are on or in more than one layer of the circuit board.

21. The circuit board of claim 15, wherein the plurality of circuit traces that connect the plurality of port connectors to the respective connectors of the switching circuit are symmetrical about an axis running passing through the first position.

22. The circuit board of claim 15, wherein the circuit board is configured to mount in a communication device that switches communications received via a plurality of ports electrically connected to respective ones of the port connectors.

* * * * *